US006885282B2

(12) United States Patent
Desai et al.

(10) Patent No.: US 6,885,282 B2
(45) Date of Patent: Apr. 26, 2005

(54) COMBINED TIRE PRESSURE MONITORING AND KEYLESS ENTRY RECEIVER

(75) Inventors: Tejas B. Desai, Sterling Heights, MI (US); Jean-Christophe Deniau, Fenton, MI (US); Melvin Leblanc, Taylor, MI (US); Steve O'Connor, West Bloomfield, MI (US); Kurt Van Drus, Macomb, MI (US); Patricia Abi-Nader, Southfield, MI (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 246 days.

(21) Appl. No.: 10/079,665

(22) Filed: Feb. 20, 2002

(65) Prior Publication Data

US 2002/0149477 A1 Oct. 17, 2002

Related U.S. Application Data

(60) Provisional application No. 60/352,489, filed on Jan. 23, 2002, provisional application No. 60/298,258, filed on Jun. 14, 2001, provisional application No. 60/290,923, filed on May 15, 2001, provisional application No. 60/276,325, filed on Mar. 16, 2001, provisional application No. 60/276,210, filed on Mar. 15, 2001, and provisional application No. 60/269,959, filed on Feb. 20, 2001.

(51) Int. Cl.[7] .......................... G05B 19/00; G06F 7/00
(52) U.S. Cl. ...................... 340/5.61; 340/5.6; 340/5.64; 340/10.1; 340/10.2; 340/10.5; 340/5.62
(58) Field of Search ................. 340/5.6, 5.61, 340/5.64, 10.1, 10.5, 5.62, 825.72, 825.69, 3.4, 10.2

(56) References Cited

U.S. PATENT DOCUMENTS 3,497,625 A    2/1970  Oxley

| 4,734,674 | A  | * | 3/1988  | Thomas et al. ............. 340/447 |
|-----------|----|---|---------|-------------------------------------|
| 5,192,929 | A  | * | 3/1993  | Walker et al. .............. 340/444 |
| 5,357,798 | A  | * | 10/1994 | Weinzerl et al. .............. 73/146 |
| 5,463,374 | A  |   | 10/1995 | Mendez et al.                        |
| 5,473,938 | A  |   | 12/1995 | Handfield et al.                     |
| 5,602,868 | A  |   | 2/1997  | Wilson                               |
| 5,661,651 | A  |   | 8/1997  | Geschke et al.                       |
| 5,963,128 | A  |   | 10/1999 | McClelland                           |
| 6,043,738 | A  |   | 3/2000  | Stewart et al.                       |
| 6,218,936 | B1 |   | 4/2001  | Imao                                 |
| 6,232,875 | B1 |   | 5/2001  | DeZorzi                              |
| 6,252,498 | B1 |   | 6/2001  | Pashayan, Jr.                        |
| 6,259,361 | B1 |   | 7/2001  | Robillard et al.                     |
| 6,271,748 | B1 |   | 8/2001  | Derbyshire et al.                    |
| 6,292,096 | B1 |   | 9/2001  | Munch et al.                         |
| 6,463,798 | B1 | * | 10/2002 | Niekerk et al. ............. 73/146.2 |
| 6,650,236 | B1 | * | 11/2003 | Ghabra et al. ............. 340/447   |

FOREIGN PATENT DOCUMENTS

| EP | 0671289 A1 | 12/1995 |
| EP | 0735219 A2 | 3/1996  |

* cited by examiner

*Primary Examiner*—Timothy Edwards
*Assistant Examiner*—Vernal Brown

(57) ABSTRACT

A system for monitoring conditions within a tire (12) including a sensor assembly (14) including a pressure sensor (36), an accelerometer (34), a temperature sensor (32), and a transmitter (40) to transmit signals indicative of current tire conditions. A remote transmitter (22) for actuating a remote keyless entry system (19) emits a signal to actuate a function of the keyless entry system (19) such as unlocking doors (20) of the motor vehicle (10). A receiver assembly (16) includes an amplitude shift keyed receiver (52) and a frequency shift keyed receiver (58) selectively engagable to receive radio frequency transmissions from the tire monitoring system or the remote keyless entry system (19).

13 Claims, 8 Drawing Sheets

COMBINED TIRE PRESSURE MONITORING AND KEYLESS ENTRY RECEIVER

The present invention claims priority to U.S. Provisional Patent Application Ser. Nos. 60/276,210 filed Mar. 15, 2001; 60/269,959 filed Feb. 20, 2001; 60/276,325 filed Mar. 16, 2001; 60/298,258 Jun. 14, 2001; 60/290,923 filed May 15, 2001 and 60/352,489, filed on Jan. 23, 2002.

BACKGROUND OF THE INVENTION

This invention relates to a system for monitoring conditions within a tire, and specifically to a receiver assembly for receiving transmissions of varying modulations from sensor assemblies within each of the tires and from a remote keyless entry system. It is becoming increasingly desirable to continually monitor tire pressures in a motor vehicle during operation. Such constant monitoring of tire pressures allows an operator to maintain vehicle tire pressures within an optimal range to optimize fuel economy and handling performance.

Conventional methods of monitoring tire pressure include positioning a sensor within each wheel to monitor pressure. The sensor assembly typically emits a radio frequency (RF) transmission indicative of tire conditions. A receiver disposed within the vehicle receives the RF signal and actuates a messages or warning light to signal the operator of tire conditions.

Many motor vehicles include a remote keyless entry system including a key fob carried by an operator to actuate door locks or other features. The remote keyless entry system includes a receiver disposed within the motor vehicle to receive transmissions from the key fob and actuate vehicle systems in response to transmissions received from the key fob. It is known in some system to utilize the same type of transmission for the tire monitoring system as is used in remote keyless entry system.

Typically, a transmission is modulated either as an amplitude shift keyed ASK, or a frequency shift keyed FSK radio frequency. The ASK transmission modulation is best suited for applications in which the receiver and transmitter are relative stationary to each other. In addition ASK transmissions are favorable when there exists a relatively long distance between the transmitter and the receiver. However, an ASK transmission becomes disrupted when the receiver or transmitter is moving relative to one another. The FSK signal is suited for transmitters that are moving relative to the receiver because the amplitude remains essentially constant for the duration of any transmission. However, the FSK transmission has lower peak field strength than a comparable ASK transmission. The FSK transmission is specifically suited for use with the sensor assembly disposed within the tire and the ASK is suited for use with the remote keyless entry system.

Accordingly, it is desirable to develop a receiver capable of receiving both ASK and FSK transmissions to optimize the capabilities of both the tire monitoring system and the remote keyless entry system.

SUMMARY OF THE INVENTION

An embodiment of this invention is a receiver assembly comprised of an amplitude key shifted (ASK) receiver and a frequency shift keyed (FSK) receiver for receiving transmissions from sensor assemblies mounted within each of the tires, and from a remote keyless entry system.

A system for monitoring conditions within tires mounted to a motor vehicle includes five tires, each with a sensor assembly. Each of the sensor assemblies gathers data indicative of conditions within the tire and transmits that data to a receiver assembly. The receiver assembly in turn forwards that data to a vehicle controller. The vehicle controller will then process the data for display to the operator of the motor vehicle.

Each tire mounts to a rim and each sensor assembly is mounted within the rim and includes a valve stem and a circuit housing. The sensor assembly includes a sensor circuit disposed within the circuit housing. The sensor circuit includes a temperature sensor, a motion sensor and a pressure sensor. An RF transmitter receives data gathered by the sensors, and relays that data to the receiver.

Each transmission from the various sensor assemblies includes a unique identity code relating to a specific sensor assembly. An initialization or learning mode defines specific sensor assemblies disposed on a specific motor vehicle. Learning the specific identity codes of the sensor assemblies eliminates errant reception of other transmissions from other sensor assemblies installed on other motor vehicles within close proximity.

The data transmitted from each of the sensor assemblies to the receiver is transmitted at predetermined intervals. There is a probability that the receiver will receive two or more data transmissions from different sensor assemblies at the same time. The receipt of two or more data transmission simultaneously or overlapped is known as a data collision. The receiver will not recognize collided data or overlapping data transmission, therefore the current invention prevents overlapping data transmissions by varying the interval between data transmission in a random manner. Another factor considered in preventing signal collision is the transmission rate that affects the length of time required to transmit data indicative of tire conditions. The faster data is transmitted and received the lower the probability of data collision. The shorter the total transmission time, the lower the probability of signal collision.

The receiver assembly comprises an amplitude shift key (ASK) receiver and a frequency shift keyed (FSK) receiver. The FSK receiver receives signals from the sensor assemblies. The ASK receiver receives signals from a key fob for a remote keyless entry system to initiate the locking or unlocking of doors.

The ASK transmissions are favorable for situations where the transmitter and receiver are substantially stationary. The ASK radio frequency transmission is easily disrupted by abrupt changes in received field strength and therefore are not favorable for sending transmissions from a moving object such as the tires of a motor vehicle. However, the ASK provides for greater signal power which is desirable for the remote keyless entry system. The FSK transmissions are favorable for conditions were the transmitter or receiver are moving during data transmission. However, an FSK transmission is amplified upon receipt, effectively removing any amplitude disturbances.

The receiver assembly switches between the ASK receiver and the FSK receiver in response to a triggering event. The triggering event is the vehicle speed. At speeds indicative of traveling along a roadway, the FSK receiver is engaged. As appreciated, a motor vehicle traveling at speed along the roadway does not require reception of ASK transmissions from a remote keyless entry transmitter to unlock the doors of the motor vehicle. Conversely, a vehicle at rest or parked is unlikely to spontaneously encounter a tire puncture, and therefore at lower speeds the ASK receiver is engaged.

An intermediate condition is encountered when the motor vehicle is idling. In this condition, the receiver assembly engages the ASK receiver due to the low speed of the vehicle, however, the tire may become punctured or encounter a condition that changes conditions within the tire. The signal from the sensor assemblies includes an ASK wake up signal that proceeds the FSK signal transmitting data indicative of current conditions within the tire. The ASK wake up signal triggers the change over from the ASK receiver to the FSK receiver. The FSK receiver remains engaged until the FSK transmission is completed and the ASK receiver is reengaged.

The system of this invention includes a receiver capable of receiving both ASK and FSK transmissions to optimize the capabilities of both the tire monitoring system and the remote keyless entry system.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
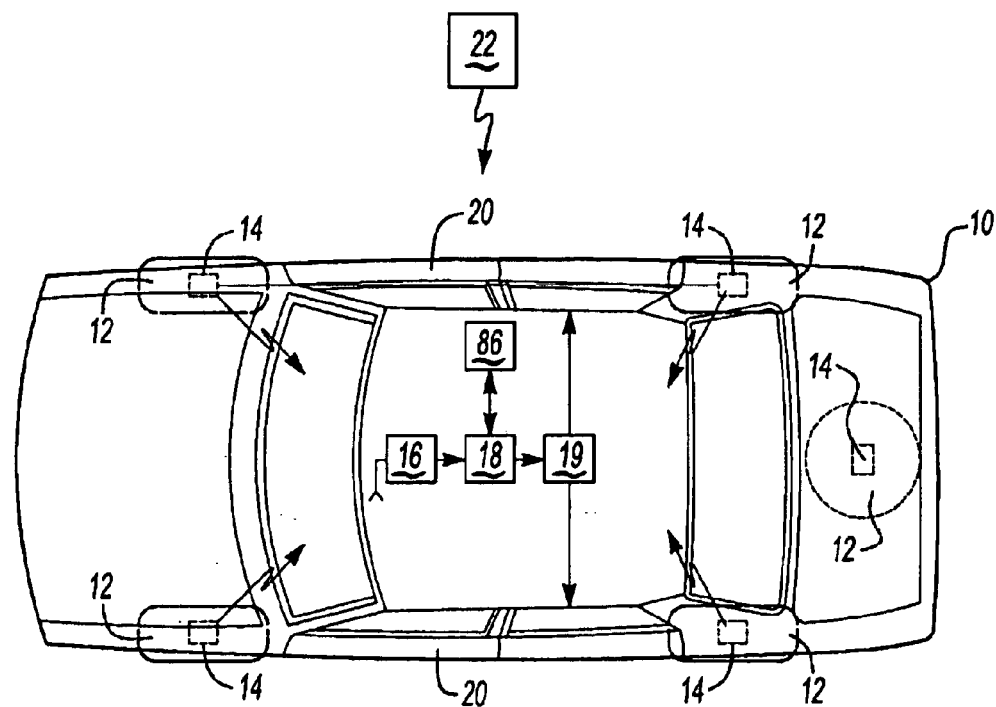
FIG. 1 is a schematic view of a motor vehicle including a tire monitoring and remote keyless entry system.

An embodiment of this invention is a system for monitoring conditions within tires mounted to a motor vehicle 10 shown schematically in FIG. 1. The motor vehicle 10 includes four tires 12 along with an additional tire 12 carried as a spare. Each of the tires 12 includes a sensor assembly 14. Each of the sensor assemblies 14 gathers data indicative of conditions within the tire 12 and transmits that data to a receiver assembly 16.

The receiver assembly 16 in turn forwards that data to a vehicle controller 18. The vehicle controller 18 will then process the data for display to the operator of the motor vehicle 10 or to the remote keyless entry system 19 to actuate unlocking of doors 20 or other such functions as are known to a worker skilled in the art. Preferably the remote keyless entry system 19 is an active system requiring actuation, such as by depressing buttons on the key fob 22, however, it is within the contemplation of this invention for passive remote keyless entry system that do not require a positive action by the operator.

Figure 2:
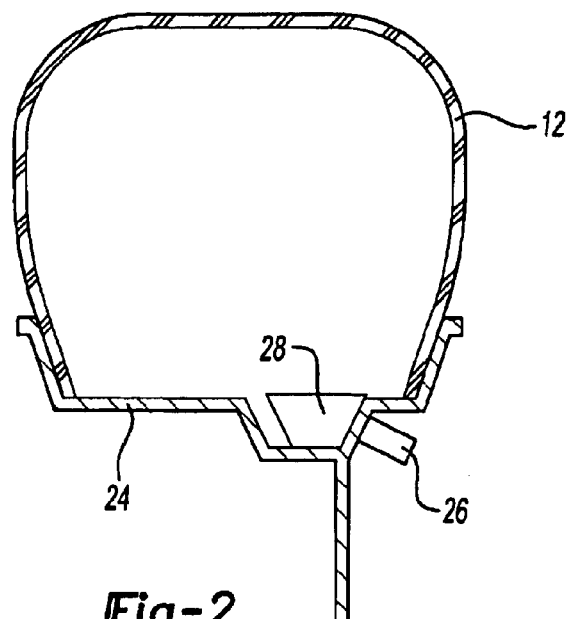
FIG. 2 is a cross-sectional view of a tire including a sensor assembly.
Figure 3:
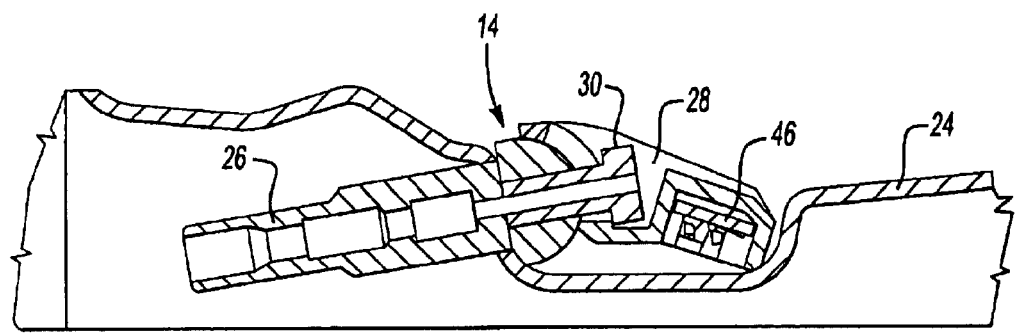
FIG. 3 is a cross-sectional view of the sensor assembly mounted within the tire.

Referring to FIGS. 2 and 3, each tire 12 mounts to a rim 24. Each sensor assembly 14 is mounted within the rim 24 and includes a valve stem 26 and a circuit housing 28. The circuit housing 28 is preferably mounted within the tire 12 and the valve stem 26 extends from the circuit housing 28 outward to provide a means of filling the tire 12 with air. A sensor circuit 46 disposed within the circuit housing 28 preferably includes a pressure sensor 36, a temperature sensor 32 and an accelerometer 34.

Figure 4:
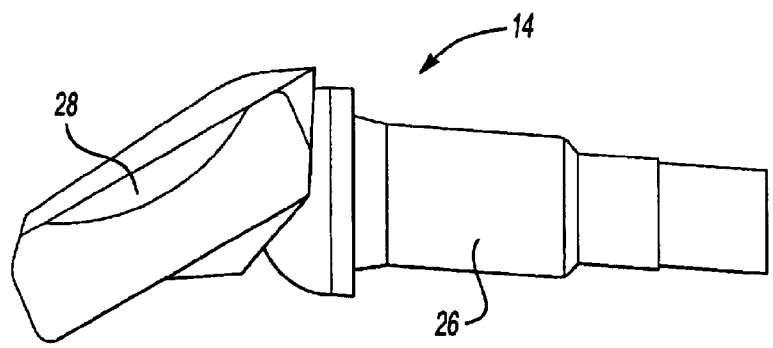
FIG. 4 is a side view of a sensor assembly.
Figure 5:
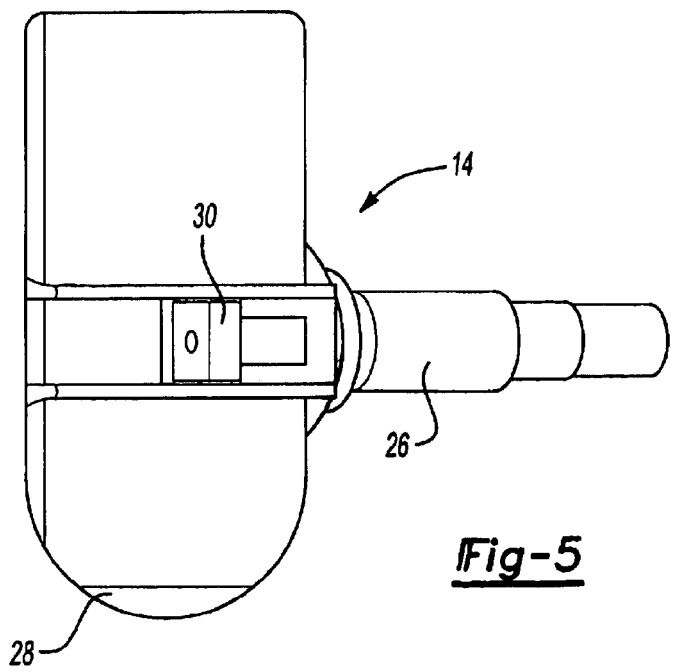
FIG. 5 is a top view of the sensor assembly.
Figure 6:
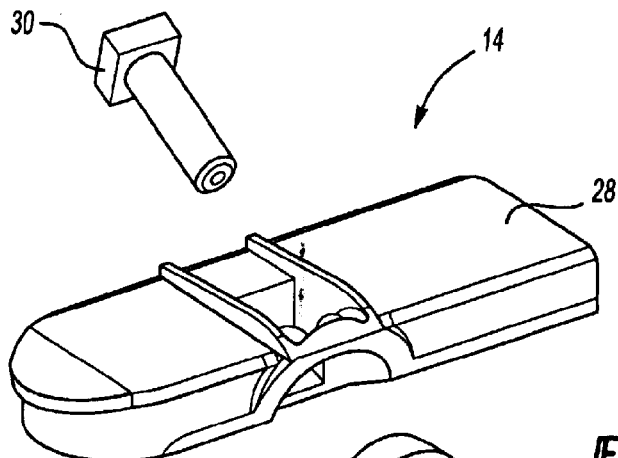
FIG. 6 is an exploded view of the sensor assembly.

Referring to FIGS. 4–6, the valve stem 26 is pivotally mounted to the circuit housing 28 to provide for use in rims 24 of various configurations. The valve stem 26 is pivotally mounted to the circuit housing 28 and locked in a desired pivotal location by a lock nut 30. Pivotal adjustment of the valve stem 26 relative to the circuit housing 28 allows for use of the sensor assembly 14 with various configurations of wheel rims 24 (FIGS. 3 and 4).

Figure 7:
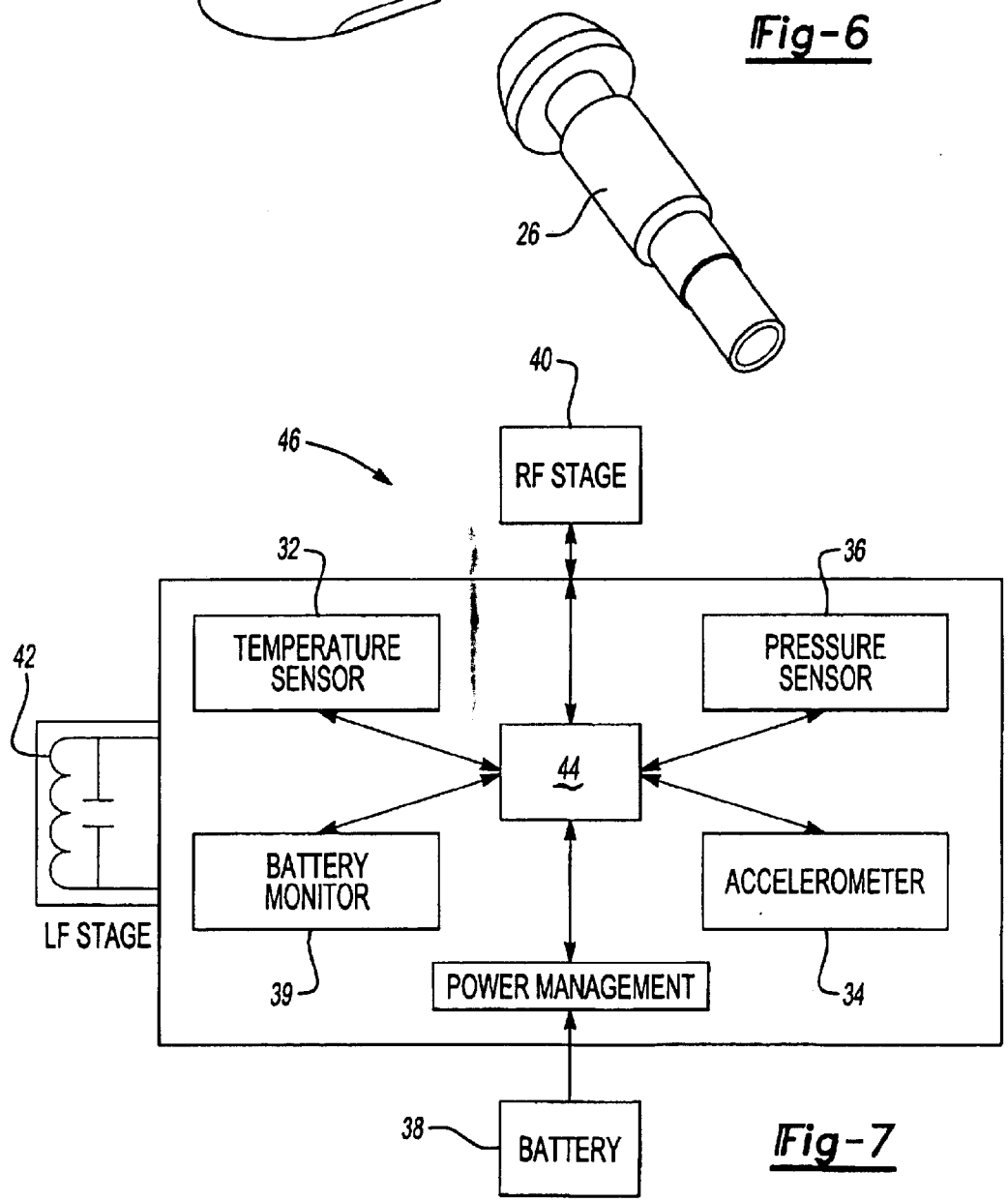
FIG. 7 is a schematic view of the circuit assembly within the sensor assembly.

FIG. 7, is a schematic view of the sensor circuit 46 disposed within the circuit housing 28. The sensor circuit 46 includes the temperature sensor 32, the accelerometer 34 and the pressure sensor 36. Each of the sensors 32, 34 and 36 are of any configuration known to a worker skilled in the art. An RF transmitter 40 receives data gathered by the sensors 32, 34, and 36 and transmits that data to the receiver 16.

A battery 38 powers the sensor circuit 46. A battery monitor measure battery power and provides a warning indicator that is sent to the receiver assembly 16 when remaining battery power attains a desired level. The receiver assembly 16 forwards the low battery signal to the vehicle controller 18 and in turn to the operator. Preferably the life of the battery 38 is of an extended length such that any necessary battery change is infrequent throughout the life span of the motor vehicle 10. A controller 44 controls how the RF transmitter 40 emits data indicative of tire conditions.

The sensor circuit 46 also includes a low frequency receiver 42. The low frequency receiver 42 receives signals generated to initiate the transmission of an identity code 68 (FIG. 8) from the sensor assembly 14 in order to initialize and localize the sensor assembly 14. Initialization of the sensor assembly 14 teaches the receiver assembly 16 the identity codes of each sensor assembly 14 installed on the motor vehicle 10 so that the receiver assembly 16 can ignore transmission received from sensor assemblies 14 of other motor vehicles. Localization teaches the receiver 16 and controller 18 the specific tire position of the sensor assembly 14 on the particular vehicle. The tire position includes left front tire, right front tire, left rear tire, and right rear tire.

Figure 8:
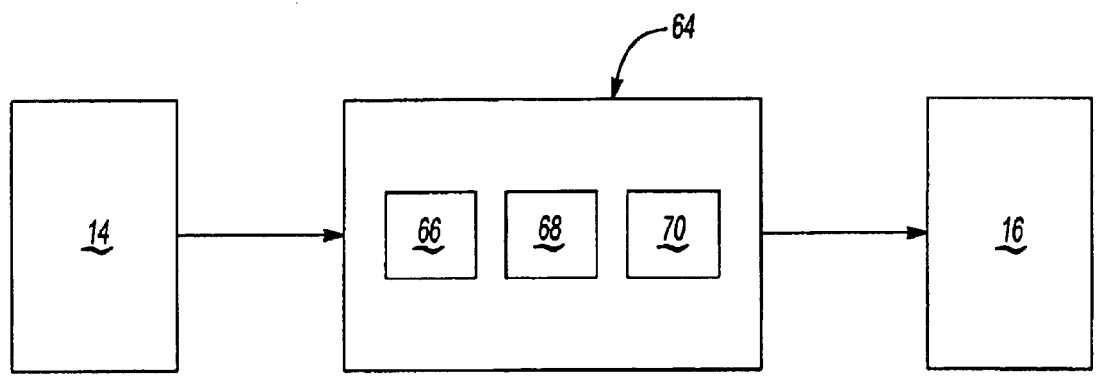
FIG. 8 is a schematic view of the components of a transmission from the sensor assembly.

Referring to FIG. 8, a transmission 64 emitted by the sensor assembly 14 includes an ASK wakeup signal 66, an identity code 68 and a data signal 70. The transmission 64 is a FSK transmission, except for the ASK wake up signal 66.

Figure 9:
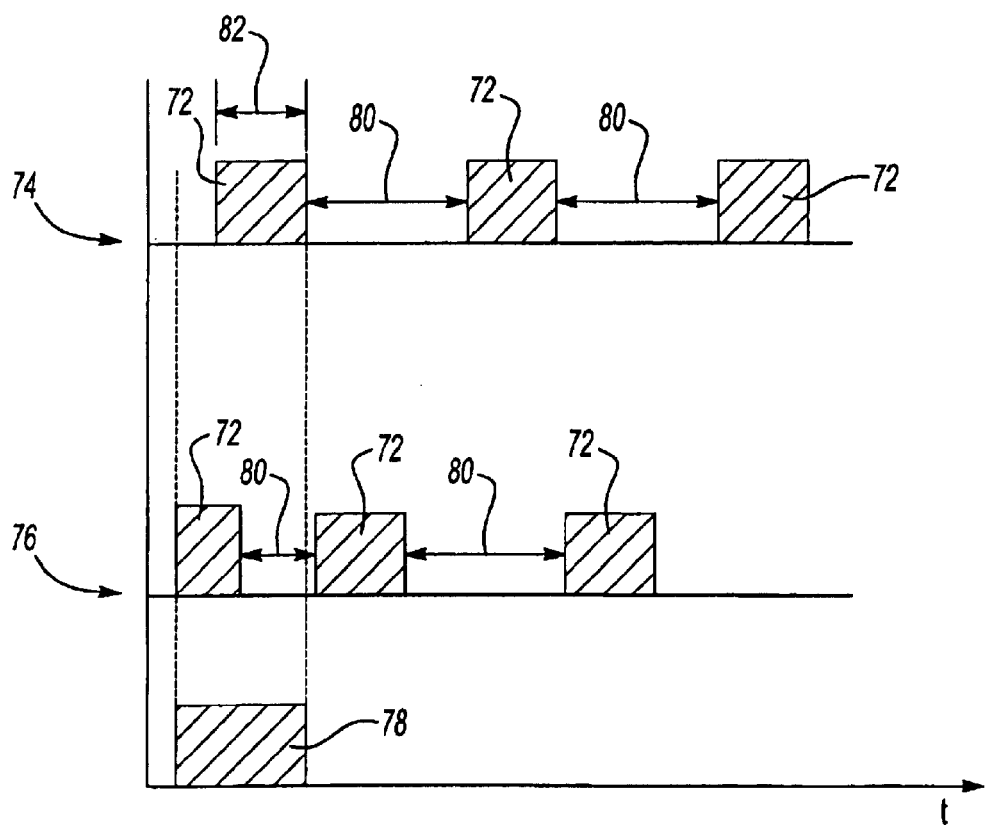
FIG. 9 is a graphical representation of the format of data packets comprising the transmission from the sensor assembly.

Referring to FIG. 9, each data transmission 64 includes a number of data frames 72. Preferably, three (3) data frames 72 are sent for each transmission 64. The data transmitted from the sensor assemblies 14 to the receiver assembly 16 are transmitted at predetermined intervals 80. There is a probability that transmissions from the various sensor assemblies 14 to the receiver assembly 16 will arrive at the same time (schematically indicated at 78). The receipt of two or more data frames 72 simultaneously or overlapped, as shown at 78, is known as a data collision. The receiver assembly 16 will not recognize collided or overlapping data transmission because the overlapped data frames 78 are of a greater duration than the receiver assembly 16 is programmed to receive. Overlapping data frames 72 cause the receiver assembly 16 to ignore the data frames 78. Repeated data collisions would eliminate data transmitted from at least two of the sensor assemblies 14.

The system of this invention includes a method of preventing repeated data collisions. The sensor assemblies 14 of this invention prevent overlapping data frames 72 by varying the predetermined interval 80 between data frames 72 in a random manner. The length of the data frame 72 is preferably 50 milli-seconds (ms) with the interval 80 varying according to the below listed equation.

Interval length=standard length*(beta*standard length)

Where: interval length is the length of time in ms between data frames;

Standard length is a predetermined duration of time in ms; and

Beta is a random variable with a value between 0 and 1.

Preferably the standard length of time is 100 ms; therefore the interval length will vary between 100 ms and 200 ms depending on the value of beta. Each transmission from the sensor assemblies 14 are sent with differing variable intervals 80, such that even if one or more data packets 72 overlap for any one transmission, subsequent data packets 72 will not overlap, thereby preventing cyclical, or repeated overlap. As appreciated, differing intervals and lengths of data frames are within the contemplation of this invention, and a worker skilled in the art would recognize the application of this method to other lengths of data transmission.

In another embodiment of this invention, the length of the variable interval 80 is transmitted to the receiver assembly 16. The receiver assembly 16 will then expect the next data packet 72 at the communicated interval. This allows the receiver assembly 16 to switch back to the ASK receiver between data frames 72.

Figure 10:
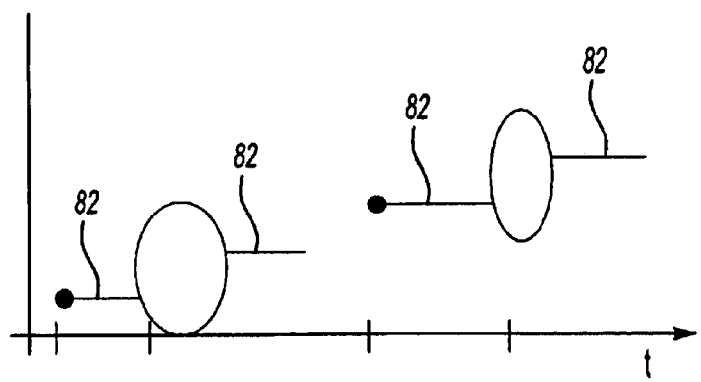
FIG. 10 is a graph illustrating the effect of transmission rate on signal overlap in prior art systems.
Figure 11:
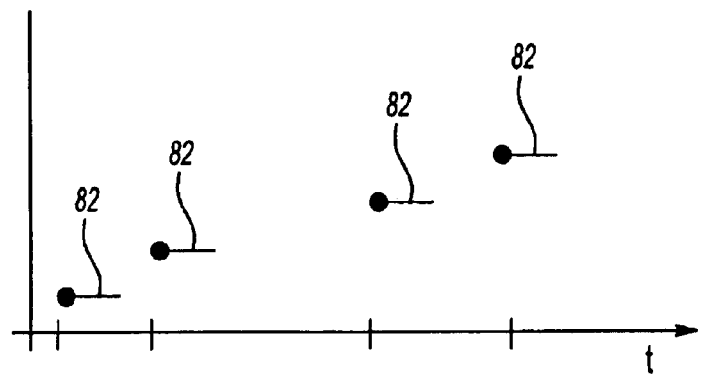
FIG. 11 is a graph illustrating how increased transmission rate prevents data overlap.

Another factor considered in preventing signal collision is the transmission rate. The faster data is transmitted and received the lower the probability of data collision. Prior art FIG. 10 illustrates the likelihood of signal collisions at a transmission rate of 4 kbaud. Each line represents the length of time required to transmit each data frame 72 from each of the sensor assemblies 14. FIG. 11 illustrates how the increase in baud rate decreases the probability of overlapping data frames 72. Each line represents a length of time to transmit one data frame 72 to the receiver assembly 16. The shorter the total transmission time, the lower the probability of signal collision. Preferably, the system of this invention includes a baud rate of 10 kbaud as shown in FIG. 11, however, a worker skilled in the art would understand that different data transmission rates are within the contemplation of this invention.

Figure 12:
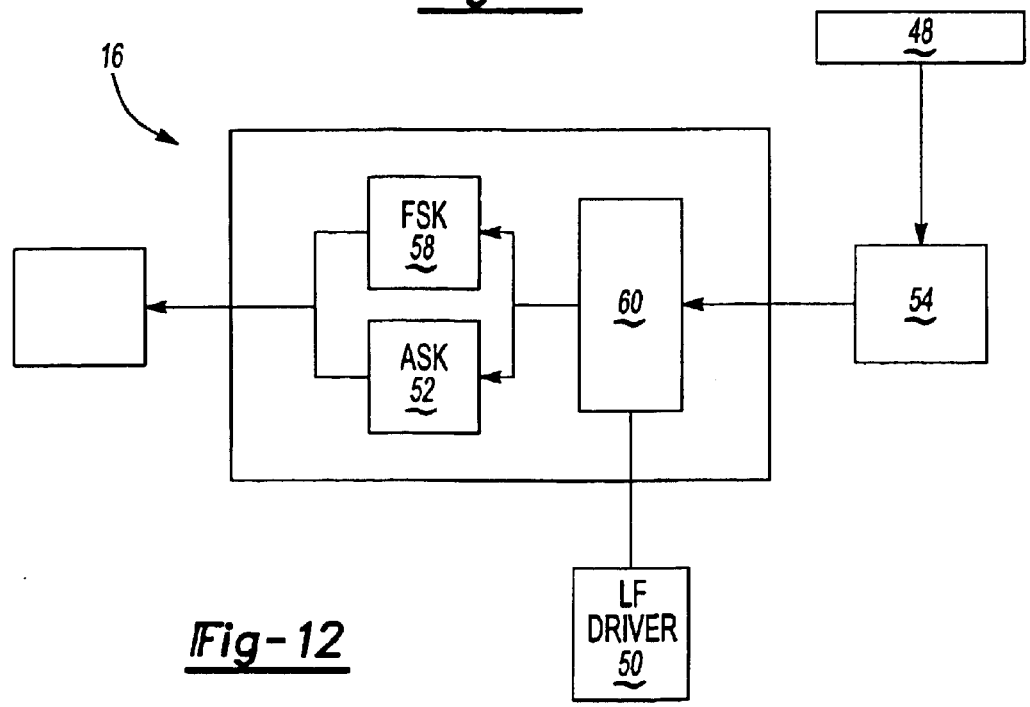
FIG. 12 is a schematic view of the receiver assembly.

Referring to FIGS. 1 and 12 the receiver assembly 16 comprises an ASK receiver 52 and a FSK receiver 58. The FSK receiver 58 receives signals from the sensor assemblies 14. The ASK receiver receives signals from a key fob 22 for the remote keyless entry system 19 to initiate the unlocking of doors 20. The receiver assembly 16 also includes an antenna 48 to receive transmissions from the key fob 22 and the sensor assemblies 14. The receiver assembly 16 includes a low frequency driver 50 to emit a signal to the sensor assemblies 14 to initiate transmission by the sensor assemblies 14.

The antenna 48 is preferably of a length one quarter that of the wavelength of the transmission received. Transmissions received by the antenna 48 proceed through a resistor 54 to the RF receiver 16. A controller 60 controls which of the receivers 58 and 52 are engaged to receive incoming transmissions.

Transmission from the various sensor assemblies 14 include the unique identity code 68 (FIG. 8) relating to a specific sensor assembly 14. The initialization or learning mode defines the specific sensor assemblies 14 disposed on a specific motor vehicle. Learning the specific identity codes 68 of each of the sensor assemblies 14 eliminates errant reception of other transmissions from other sensor assemblies 14 installed on other motor vehicles. Initialization occurs by matching the sensor assemblies 14 of a specific motor vehicle with the receiver assembly 16 of that motor vehicle. The receiver assembly 16 disposed within the motor vehicle 10 will receive numerous signals from surrounding RF transmitting sources such as radios, electrical appliances and other vehicle systems equipped with similar tire sensing systems.

Figure 13:
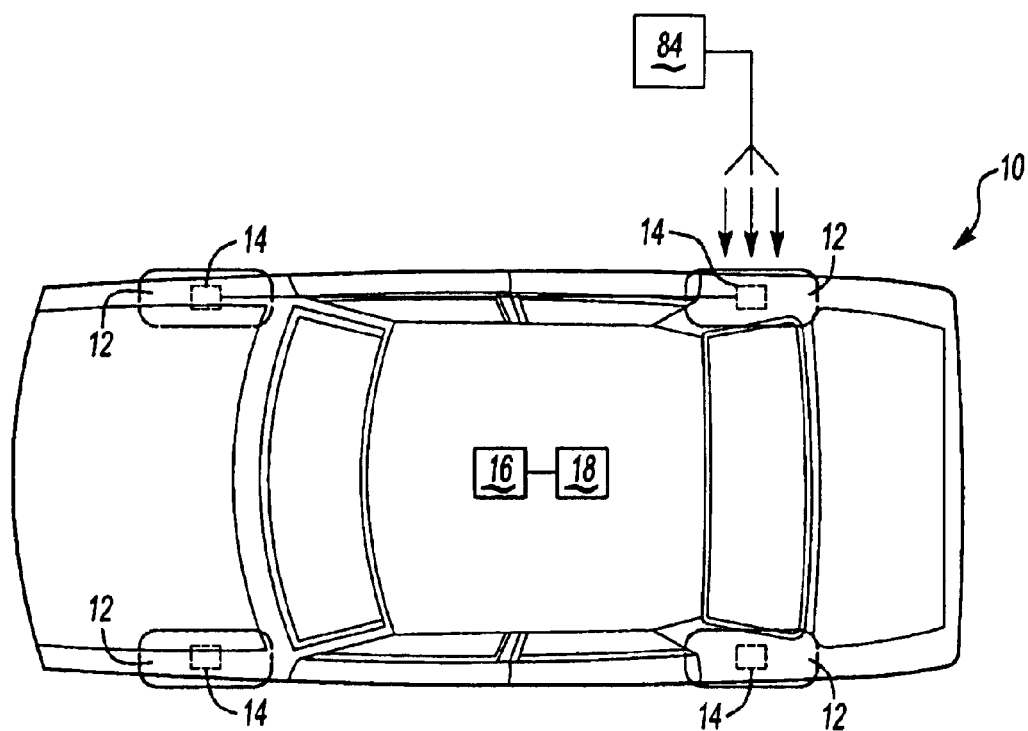
FIG. 13 is a schematic view of a motor vehicle and an external triggering device to initialize the sensor assemblies.

Referring to FIG. 13, an embodiment of initialization includes placing the receiver assembly 16 (FIG. 1) in a learn mode and actuating each sensor assembly 14 through the use of a triggering device, schematically shown at 84. The triggering device can be a magnet, a transponder located at a programming station or a low frequency emitter positioned on the motor vehicle. The triggering device 84 initiates each sensor assembly 14 in sequence to transmit the identity code 68. The sequence of initiating transmission of the identity code 68 indicates the location of the sensor assembly 14 on the motor vehicle 10. The first sensor assembly 14 triggered is the front left tire, the second is the front right and so on until all the tires on the motor vehicle have been triggered to transmit the identity code 68 to the receiver assembly 16. The identity code 68 is stored sequentially to indicate the position of the specific sensor assembly 14. The receiver assembly 16 learns which sensor assembly 14 belongs to the specific motor vehicle. In addition to the specific location on the sensor assembly on the motor vehicle such as the front right or front left tire is also recorded in the receiver assembly 16. This operation is repeated any time the tires 12 of the motor vehicle are changed or rotated.

Another embodiment of initialization requires no external trigger. Instead an acceleration value from the motor vehicle 10 is communicated to the vehicle controller 18 and compared to accelerometer data transmitted from each of the sensor assemblies 14. The accelerometer 34 of each sensor assembly 14 transmits acceleration information of the tire 12. The acceleration value of each tire 12 is compared to the acceleration value provided by another vehicle system, such as the anti-lock braking system or transmission system (indicated schematically in FIG. 1 at 86). If the acceleration signals are equal within a predetermined tolerance value, the identity code 68 sent within the transmission from the sensor assembly 14 will be recorded as belonging to the specific motor vehicle.

The initialization or learning process using the compared values of acceleration may be repeated whenever the motor vehicle 10 is in a non-moving position for a predetermined length of time. The purpose of the relearning of the sensor assembly identification codes is to allow for changing or rotating of the tires 12 and thereby the sensor assembly 14.

The predetermined amount of time allows for the possibility that one of the sensor assemblies 14 may have been changed, for instance when a spare tire is installed.

In the instance, where a new tire, and thereby a new sensor assembly 14 is installed, the receiver assembly 16 receives the new identity code of the new sensor assembly 14 during initial movement of the motor vehicle 10. The receiver assembly 16 compares the acceleration signal belonging to the new identity code of the new sensor 14 and compares it to the acceleration of the vehicle 10. If the vehicle acceleration is comparable, the receiver assembly 16 will recognize the new sensor assembly 14 after a predetermined amount of time or number of data frames. This is transparent to the operator of the motor vehicle.

Figure 14:
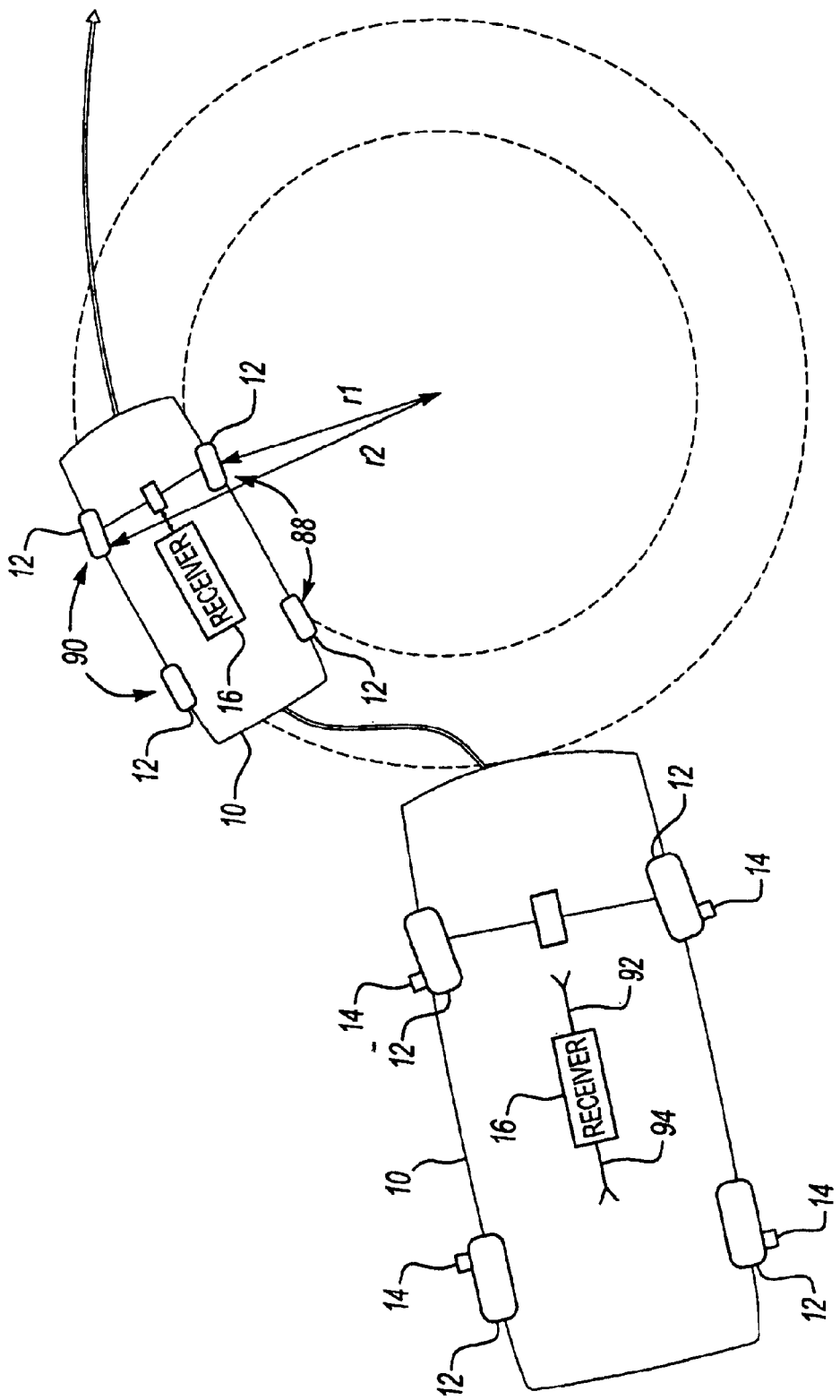
FIG. 14 is a schematic view of a method of determining sensor assembly position.

Referring to FIG. 14, in another embodiment of this invention, localization of each of the sensor assemblies 14 is established by comparing data obtained from another vehicle system 86 indicative of a turn of the motor vehicle 10. The tires 12 of a motor vehicle travel different distances when turning. The inner tires 88 travel along a first radius indicated at r1 and the outer tires 90 move along a second radius r2. Acceleration and turning data is compared to the acceleration at each wheel. Data transmitted from a sensor assembly 14 mounted to one of the inner tires 88 of the motor vehicle will indicate a lower acceleration than that of a sensor assembly 14 mounted to on of the outside wheels 90. Therefore, the side that the sensor assembly 14 is positioned is indicated by the magnitude of acceleration of that tire relative to the acceleration and direction of the motor vehicle 10. Accelerometer correlation determines whether the sensor assembly is on the left or right side of the motor vehicle 10, however, this does not indicate whether the sensor assembly 14 is a front or rear tire.

In one embodiment of localization the front to rear location of the tire 12 is accomplished by detecting signal strength of the transmission sent from each of the sensor assemblies 14. In this embodiment, the receiver assembly 16 includes front and rear antennas 92, 94. Transmissions received at each antenna 92,94 are measured for field strength. The rear antenna 94 will receive transmissions having higher field strength from the sensor assemblies 14 disposed on the rear tires of the motor vehicle 10. The front antenna 92 will receive a stronger transmission from sensor assemblies 14 disposed on the front tires of the motor vehicle 10. The field strength data provides the data indicating the front or rear position of each sensor assembly 14 and the acceleration data correlated to the turning radius of the motor vehicle 10 provides the left or right position of each of the sensor assemblies 14.

Figure 15:
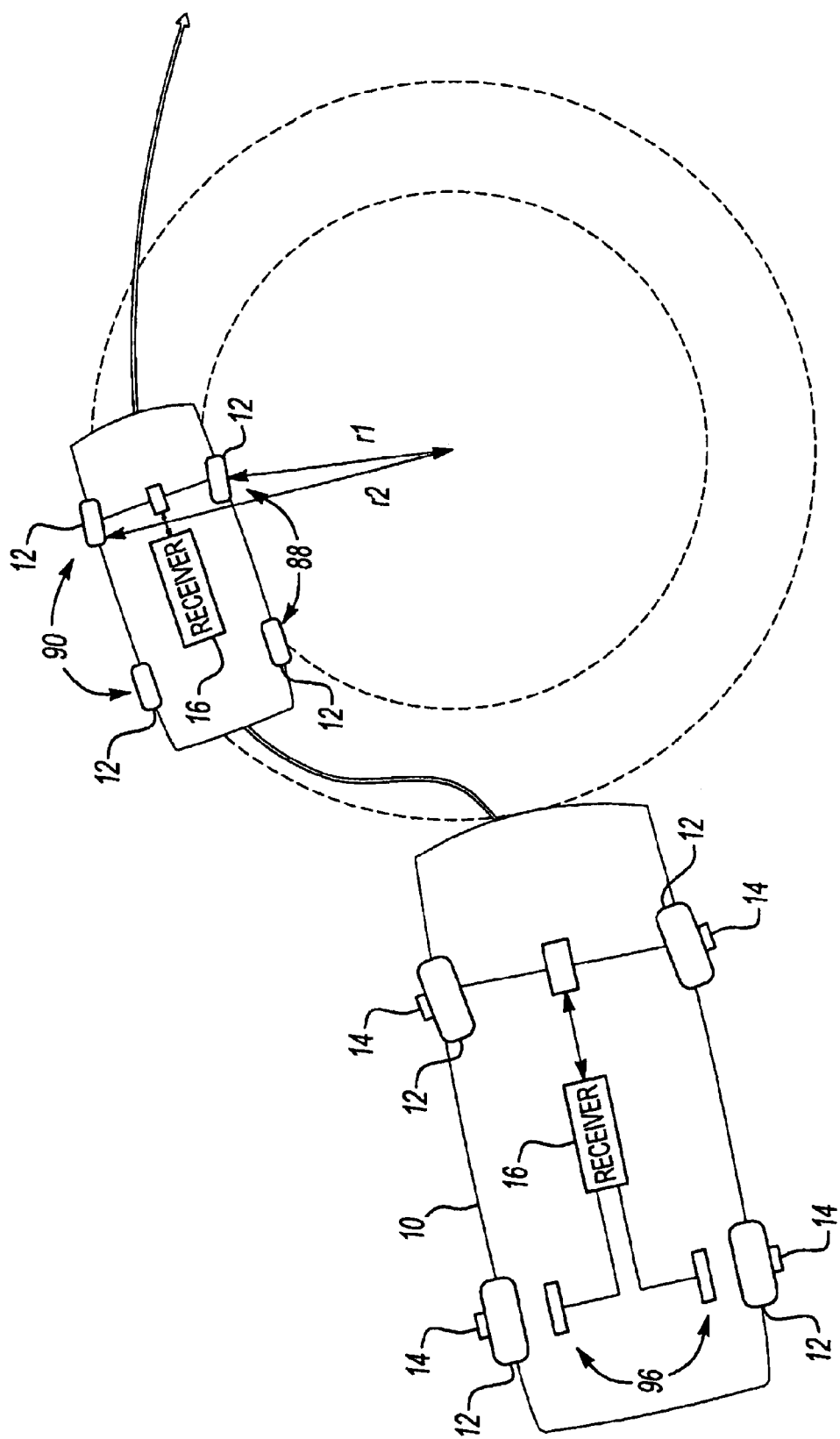
FIG. 15 is a schematic view of another embodiment of determining sensor assembly position.

Referring to FIG. 15, another embodiment of localization combines low frequency transmissions with correlation of acceleration to determine the position of the sensor assemblies 14. Low frequency emitters 96 are positioned to initiate transmission from the rear sensor assemblies 14. A transmission from the low frequency emitter triggers the transmission of the rear sensor assemblies 14 that is then received by the receiver assembly 16 to indicate a rear location of the tires 12. This provides the data required to determine the front and rear position of any particular sensor assembly 14. The left and right position is determined by correlating accelerometer data obtained from each of the sensor assemblies 14. Further, a worker knowledgeable in the art will recognize that other combination of low frequency initiating transmissions and correlation of accelerometer data can be used to determine the specific location of any of the sensor assemblies 14 disposed on the motor vehicle 10.

The receiver assembly 16 of this system is also used with the remote keyless entry system 19. The receiver assembly 16 is configured to receive transmission from both the sensor assemblies 14 and the key fob 22 (FIG. 1). Although a key fob 22 is specifically described it is within the contemplation of this invention that the remote entry system 19 include other active or passive transmitting means to initiate entry or operation of the motor vehicle 10.

The receiver assembly 16 includes the ASK receiver 52 and the FSK receiver 58. This configuration allows the receiver assembly 16 to be used for both the remote keyless entry system 19 and the tire monitoring system.

ASK transmissions are favorable for situations where the transmitter and receiver are substantially stationary. The ASK radio frequency transmission is easily disrupted by abrupt changes in received field strength and therefore are not favorable sending transmission from a moving object such as the tires 12 of a motor vehicle 10. The changes from received field strength can change for any number or reasons within a motor vehicle including interference created by other onboard systems, to the specific environment present at the time of the signal. However, the ASK provides for greater signal power which is desirable for the remote keyless entry system of this invention. The ASK transmission allows for higher peak output field strength, relative to a comparable FSK transmission. However, the ASK transmission decreases typical battery life and is therefore not desirable for applications such as tire condition sensing that require longer battery life due to the difficulty of changing batteries of the sensor assemblies disposed within the tire of the motor vehicle.

FSK transmissions are favorable for conditions were the transmitter or receiver are moving during data transmission. As appreciated, rotation of a tire will introduce amplitude variations in the transmission caused by the changes in interference patterns. If sensor assembly 14 data was transmitted by way of an ASK transmission, the noise caused by rotation of the tire would cause data in the transmission to become corrupted. However, an FSK transmission is amplified upon receipt to effectively remove any amplitude disturbances. Further, the FSK transmission is less power intensive and therefore more adaptable to the sensor assembly application that requires longer battery life.

Referring to FIG. 12, the receiver assembly 16 defaults to sending any transmission to the ASK receiver 52. The ASK receiver 52 operates at a lower power and is therefore the default receiver that is on when the receiver assembly 16 is activated. The ASK receiver 52 is engaged while the motor vehicle 10 is stopped or parked. Preferably, the ASK receiver 52 is engaged in response to the speed of the motor vehicle being below a predetermined speed. Preferably, the predetermined speed is 10 mph. Above 10 mph, the receiver assembly 16 will change over to the FSK receiver 58. The switch is initiated because it is unlikely that the remote keyless entry system 19 will be activated while the vehicle 10 is traveling at speed. The FSK receiver 58 will then receive transmissions from the sensor assemblies 14.

The conditions of the motor vehicle 10 traveling above the desired speed or in a parked position provide definite indicators for the switch between FSK and ASK receivers 58, 52. However, when the vehicle 10 is idling, for instance in a traffic jam, but not moving at the desired speed to switch from the ASK receiver 52 and the FSK receiver 58 the system will not switch over to the FSK receiver 58 unless another conditions is satisfied. Each transmission 64 (FIG. 8) includes the ASK wake up signal 66 that is sent prior to the FSK transmission. The ASK wake up signal 66 alerts the receiver assembly 16 to incoming FSK transmission, which causes the receiver assembly 16 to switch over to the FSK receiver 58. The switch over allows the receiver assembly 16 to accept data indicative of tire conditions from the sensor assemblies 14 while the automobile is parked or idling in traffic.

Preferably, each of the sensor assemblies 14 will transmit a signal indicative of tire conditions at differing rates depending on the speed of the motor vehicle. At speeds above a predetermined speed the sensor assemblies 14 will transmit tire condition data at a greater frequency. At lower speeds, indicative of a parked vehicle, the sensor assemblies 14 transmit at a lower rate. Preferably, the predetermined speed is 10 mph and the sensor assemblies 14 will transmit signals indicative of tire conditions once every minute. Below the 10 mph predetermined speed threshold the sensor assemblies 14 will transmit signals only after sensing a change in tire pressure above a desired amount indicative of a tire 12 losing air pressure. Once an initial loss of pressure is sensed, the sensor assemblies 14 are triggered to transmit signals at one-minute intervals. Although, specific speeds and intervals of data transmission are discussed, a worker knowledgeable in the art will understand that it is within the contemplation of this invention to use other speeds and data transmission intervals according to specific application criteria. The selective actuation of the transmitter 40 for each sensor assembly and the switching between the ASK and FSK receivers 52,58 prevent signal collisions between ASK and FSK transmission emitted by the remote keyless entry system 19 and the tire monitoring system. Preventing signal collisions optimizes function of the receiver assembly 16.

The foregoing description is exemplary and not just a material specification. The invention has been described in an illustrative manner, and should be understood that the terminology used is intended to be in the nature of words of description rather than of limitation. Many modifications and variations of the present invention are possible in light of the above teachings. The preferred embodiments of this invention have been disclosed, however, one of ordinary skill in the art would recognize that certain modifications are within the scope of this invention. It is understood that within the scope of the appended claims, the invention may be practiced otherwise than as specifically described. For that reason the following claims should be studied to determine the true scope and content of this invention.

What is claimed is:

1. A system for monitoring conditions within a tire comprising:
    a sensor assembly disposed within each tire of a motor vehicle,
    a transmitter in communication with said sensor assembly to transmit a frequency shift keyed transmission indicative of current tire conditions;
    a remote transmitter for actuating a remote keyless entry system, said remote transmitter emitting a amplitude shift keyed transmission to actuate a function of said keyless entry system;
    a receiver assembly for receiving said frequency shift keyed transmission signal indicative of said current tire conditions and said amplitude shift keyed transmission signal to actuate a function from said remote transmitter, said receiver assembly including an amplitude shift keyed receiver, and a frequency shift keyed receiver, said amplitude shift keyed receiver and said frequency shift keyed receiver are selectively engaged in receive incoming signals in response to a predetermined triggering event wherein said transmission indicative of current tire conditions includes an amplitude shift keyed wake-up signal for alerting said receiver assembly of an incoming frequency shift keyed transmission signal such that said amplitude shift keyed wake-up signal initiates a switch from said amplitude shift keyed receiver to said frequency shift keyed receiver.

2. The system of claim 1, wherein said predetermined triggering event is the current speed of the motor vehicle.

3. The system of claim 2, wherein said amplitude shift keyed receiver is engaged to receive incoming signals for speeds below a predetermined speed threshold of the said motor vehicle and said frequency shift keyed receiver is engaged to receive incoming signals for speeds above said predetermined speed threshold.

4. The system of claim 1, wherein said transmitter sends said signal at predetermined intervals, said predetermined intervals varied in response to motor vehicle speed.

5. The system of claim 1, wherein said predetermined interval is greater at speeds above said predetermined speed threshold than below said predetermined speed threshold.

6. The system of claim 5, wherein said predetermined interval increases in response to variation of pressure within one of said tires.

7. The system of claim 1, wherein said transmission indicative of said tire conditions includes a plurality of data frames sent at random time intervals to prevent repeated overlap of transmissions from two or more of said sensor assemblies.

8. The system of claim 7, wherein said random time interval is transmitted to said receiver assembly such that said receiver assembly anticipates subsequent data frames of said transmission indicative of said tire condition.

9. The system of claim 8, wherein said amplitude shift keyed receiver is engaged during said random time interval.

10. A method of preventing data transmission overlap between signals emitted from a tire pressure monitoring system and a remote keyless entry system, said method comprising the steps of:
    a. setting a receiver assembly including an amplitude shift keyed receiver and a frequency shift keyed receiver such that incoming transmissions are received by said amplitude shift keyed receiver; and
    b. switching from said amplitude shift keyed receiver to said frequency shift receiver in response to a triggering event, wherein said triggering event includes receiving an amplitude shift keyed wake-up signal from said tire pressure monitoring system.

11. The method of claim 10, further including the steps of emitting a frequency shift keyed transmission from said tire pressure monitoring system, and emitting an amplitude shift keyed transmission from said remote keyless entry system.

12. The method of claim 10, wherein said triggering event is further defined as obtaining a vehicle speed above a predetermined threshold value.

13. The method of claim 10, wherein said amplitude shift keyed wake up signal from the tire pressure monitoring system alerts the receiver assembly of a subsequent frequency shift keyed transmission.

* * * * *